(12) United States Patent
Shimada et al.

(10) Patent No.: US 8,885,260 B2
(45) Date of Patent: Nov. 11, 2014

(54) HEAD-UP DISPLAY DEVICE

(71) Applicant: Yazaki Corporation, Tokyo (JP)

(72) Inventors: Takahiro Shimada, Shimada (JP); Junichi Sasaki, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/713,448

(22) Filed: Dec. 13, 2012

(65) Prior Publication Data

US 2013/0155521 A1    Jun. 20, 2013

(30) Foreign Application Priority Data

Dec. 15, 2011   (JP) .................................. 2011-274715

(51) Int. Cl.
*G02B 27/14*   (2006.01)
*G03H 1/00*   (2006.01)
*H04N 7/00*   (2011.01)
*G02F 1/1335*   (2006.01)
*G02B 27/01*   (2006.01)

(52) U.S. Cl.
CPC .... *G02B 27/0149* (2013.01); *G02B 2027/0159* (2013.01); *G02B 2027/0198* (2013.01)
USPC ................ 359/630; 359/13; 348/115; 349/11

(58) Field of Classification Search
USPC ................ 359/409–410, 462, 466, 638–639, 359/13–14, 603–636, 404, 407; 345/7, 9, 345/156; 348/115; 353/11–12, 28, 119; 349/11; 701/1; 310/49 R, 156.32, 310/156.33, 156.34, 156.35, 266–268, 310/156.02; 340/438, 980, 995.1, 815.47, 340/815.74
See application file for complete search history.

(56) References Cited

U.S. PATENT DOCUMENTS

2006/0022896 A1* 2/2006 Kumon et al. .................... 345/7
2011/0061482 A1* 3/2011 Maruyama et al. .......... 74/89.23

FOREIGN PATENT DOCUMENTS

| JP | 2008055940 A | 3/2008 |
| JP | 2009-126494 A | 6/2009 |
| JP | 2010015037 A | 1/2010 |
| JP | 2011-131651 A | 7/2011 |

OTHER PUBLICATIONS

Office Action and Search Report issued on Aug. 15, 2014 in the corresponding Chinese patent application No. 201210548303.8.

* cited by examiner

*Primary Examiner* — Dawayne A Pinkney
(74) *Attorney, Agent, or Firm* — Sughrue Mion, PLLC (57) ABSTRACT

A headup display device includes a driving mirror configured to reflect a display light irradiated from an indicator to guide the reflected display light to a windshield of a vehicle. The driving mirror includes a base plate fixed to a bottom surface of a casing, a pair of opposite support plates which are upright on the base plate, a holder pivotally supported by the opposite support plates, a reflective mirror held by the holder, a driving motor configured to pivot the holder to change an angle of the reflective mirror, and a positioning projection provided on the support plate and protruding in a mounting direction of the base plate to the bottom surface of the casing. A holding recessed portion is formed on the casing to allow an insertion of the positioning projection therein and hold the positioning projection at a predetermined position.

3 Claims, 9 Drawing Sheets

HEAD-UP DISPLAY DEVICE

BACKGROUND

1. Technical Field

The present invention relates to a headup display device capable of projecting a virtual image on a projection area of a windshield in a vehicle, and allowing the projected virtual image and a foreground of the vehicle to be superimposed and visually recognized through the windshield from an eye point of the vehicle.

2. Background Art

In recent years, with increased and diversified information required by a driver for driving, vehicles such as automobiles or trains employ headup display devices (HUDs) that display a virtual image of information to be notified the driver of such as information high in the degree of urgency on a windshield of a vehicle, and allow the virtual image and a foreground of the vehicle to be visually recognized through the windshield in a superimposed manner.

Figure 9:
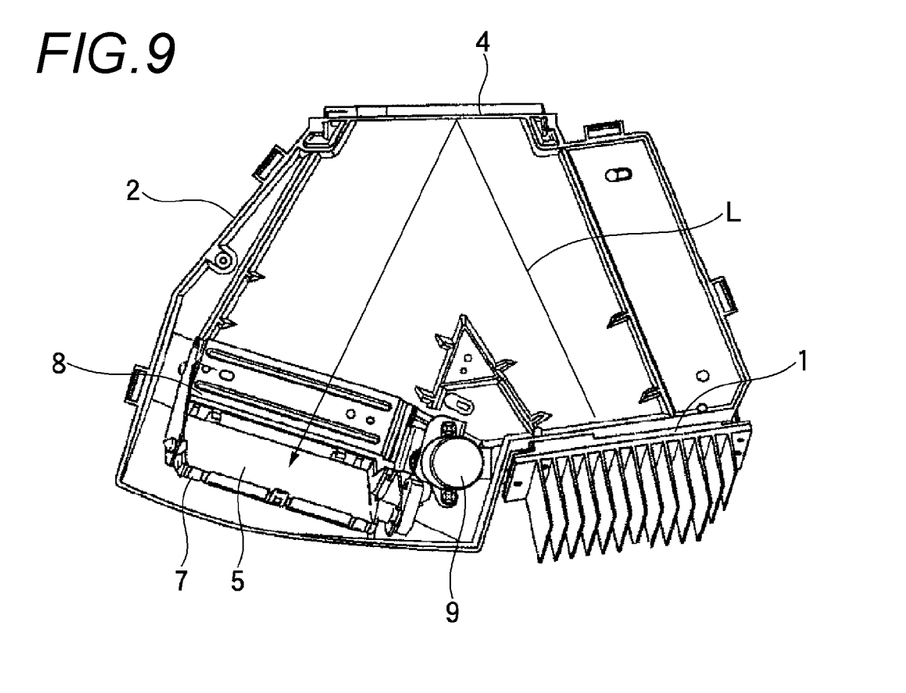
FIG. 9 is a horizontal crosssectional view of a headup display device according to the related art.

As illustrated in FIG. 9, the headup display device includes an indicator 1 for emitting a display light L, a casing 2 onto which the display light L is incident from the indicator 1, reflective plates 4 and 5 received in the casing 2 to reflect the display light L incident in the casing 2 and then guide it to an opening (not illustrated) provided in the casing 2, and a transparent plate (not illustrated) covering the opening 3 (see JPA200855940 and JPA201015037).

The reflective plate 5 includes a holder 7, a base plate 8, and a step motor 9. The reflective plate 5 is held by the holder 7, and the holder 7 is pivotally supported by the base plate 8. The reflective plate 5 is fixed by screwing the base plate 8 to a bottom surface of the case 2. The step motor 9 pivots the holder 7 which holds the reflective plate 5. As the holder 7 is pivoted by the step motor 9, a direction of the reflective plate 5 is changed. In this way, when the holder 7 is pivoted by the step motor 9, the reflective plate 5 changes an irradiation direction of the display light.

SUMMARY

In the headup display device combined with optical components, if positional displacement occurs in each optical component, the display position of the virtual image is largely displaced. In particular, in an instrumental portion for adjusting a projection angle of the reflective plate 5 by pivoting the holder 7 using the step motor 9, torque generated when the holder 7 is pivoted acts on the base plate 8, so that the base plate 8 may be deflected. If so, there is a problem in that the angle of the reflective plate 5 is shifted, and thus the display position of the virtual image is displaced.

The present invention has been made in view of the above circumstances, and an object of the present invention is to provide a headup display device capable of adjusting a projection angle of a display light while suppressing displacement of a display position of a virtual image as much as possible.

A headup display device according to aspects of the present invention is achieved by any one of the following configurations (1) to (3).

(1) A headup display device, including:
a casing having a bottom surface; and
a driving mirror configured to reflect a display light irradiated from an indicator to guide the reflected display light to a windshield of a vehicle, the driving mirror including:
a base plate fixed to the bottom surface of the casing;
a pair of opposite support plates which are upright on the base plate;
a holder pivotally supported by the pair of opposite support plates;
a reflective mirror held by the holder;
a driving motor configured to pivot the holder to change an angle of the reflective mirror; and
a positioning projection provided on each of the pair of support plates near a support portion of the holder and protruding in a mounting direction of the base plate to the bottom surface of the casing, wherein
a holding recessed portion is formed on the casing to allow an insertion of the positioning projection therein and hold the positioning projection at a predetermined position.

(2) The headup display device according to the configuration (1), wherein
a bottom surface of the holding recessed portion forms a deformation suppressing wall which is disposed against the positioning projection without a gap ahead of an acting direction of torque, which is generated when the holder is pivoted by the driving motor, acting on the pair of support plates, to suppress deformation of the pair of support plates when the holder is pivoted.

(3) The headup display device according to the configuration (1) or (2), wherein
a positioning portion having the positioning projection provided on one of the pair of support plates is formed perpendicularly from a surface of the one of the pair of support plates, and
a positioning portion having the positioning projection provided on the other of the pair of support plates is formed parallel from a surface of the other of the pair of support plates.

According to the headup display device of the configuration (1), the positioning projection on the support plate of the base plate near the support portion of the holder is positioned and held by the holding recessed portion of the casing. Even though the support plate of the base plate is about to be deformed by the torque generated when the holder is pivoted to change the angle of the reflective mirror, the positioning projection is held by the holding recessed portion of the casing, thereby suppressing deformation of the support plate.

In this way, it is possible to suppress the angle of the reflective mirror from being displaced due to the deformation of the support plate of the base plate. Accordingly, it is possible to suppress the displacement in the display position of the virtual image which is reflected from the reflective mirror and illuminated on the windshield of the vehicle.

That is, the positional accuracy of the reflective mirror adjusting the projection angle of the display light is improved, thereby suppressing the displacement in the display position of the virtual image as much as possible.

According to the headup display device of the configuration (2), since the deformation suppressing wall which is formed by the bottom surface of the holding recessed portion is disposed against the positioning projection without a gap ahead of an acting direction of the torque, which is generated when the holder is pivoted by the driving motor, acting on the support plate, the deformation suppressing wall receives the positioning projection, thereby reliably suppressing the support plate from being deformed.

According to the headup display device of the configuration (3), since the positioning portions formed on the pair of support plates are extended in different directions, the holding recessed portions receives the forces from any directions applied to the positioning portions, thereby reliably suppressing the support plate from being deformed.

The present invention can provide the headup display device capable of adjusting the projection angle of the display light while suppressing displacement of the display position of the virtual image as much as possible.

As described above, the present invention is briefly explained. A detail of the present invention will be apparent by reading the embodiment for carrying out the invention as explained later with reference to the accompanying drawings.

DETAILED DESCRIPTION

Hereinafter, an embodiment of the present invention will be described with reference to the accompanying drawings.

In this embodiment, a headup display device using a VFD (Vacuum Fluorescent Display), such as AMVFD (Active Matrix Vacuum Fluorescent Display), as an indicator will be described herein.

Figure 1:
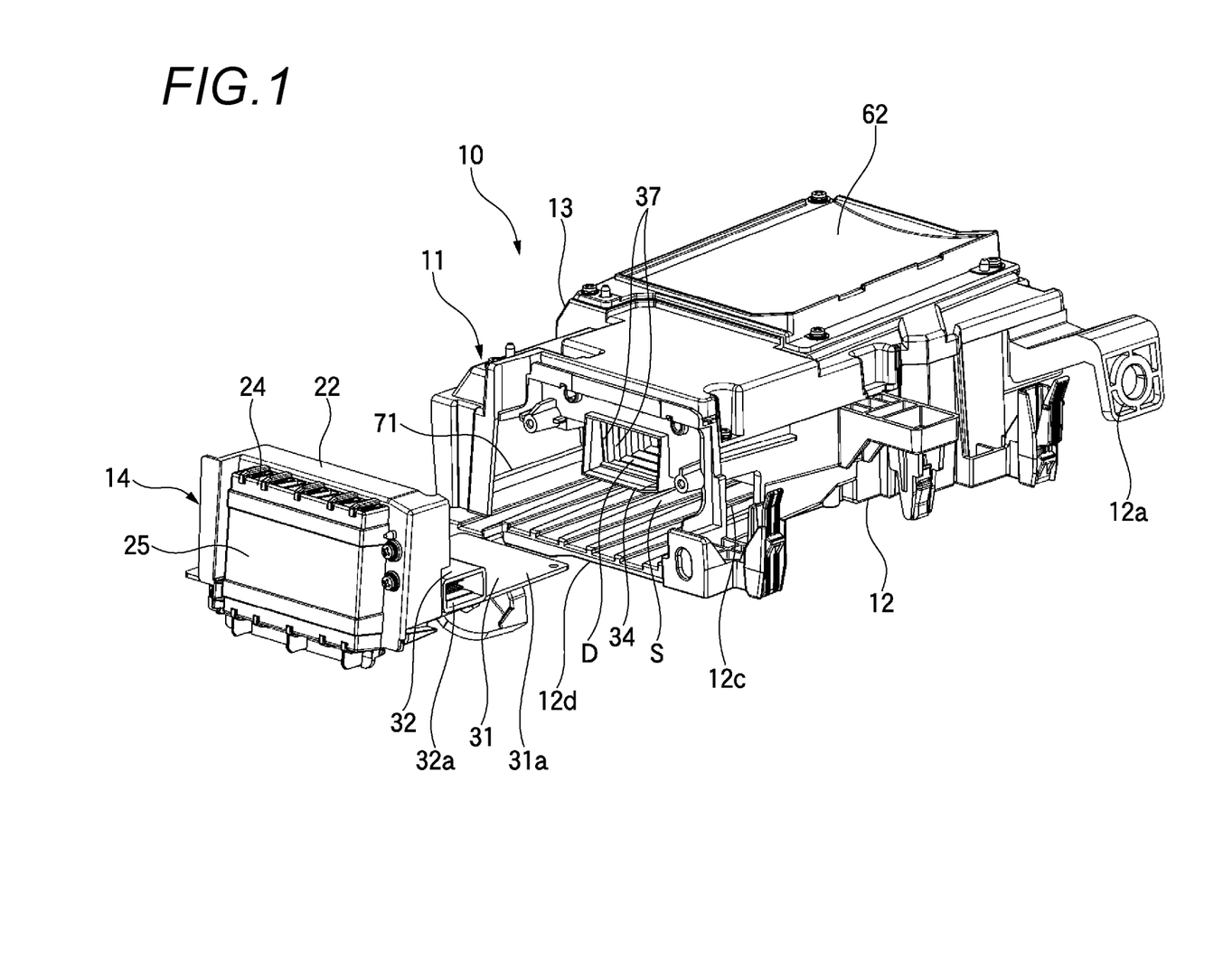
FIG. 1 is a perspective view illustrating a headup display device according to an embodiment of the present invention, from which an indicator assembly and a wiring substrate are detached.
Figure 2:
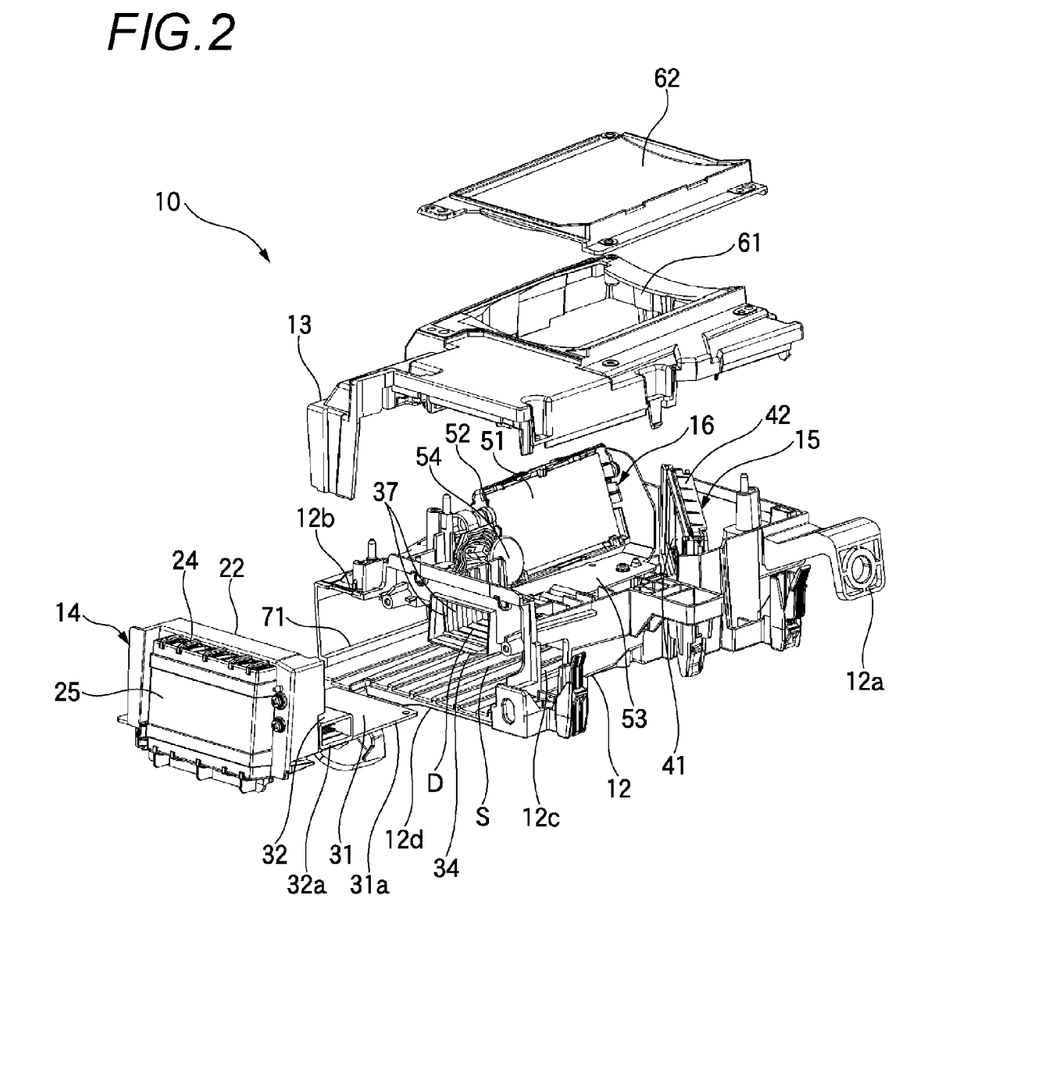
FIG. 2 is an exploded perspective view of the headup display device according to the embodiment of the present invention.
Figure 3:
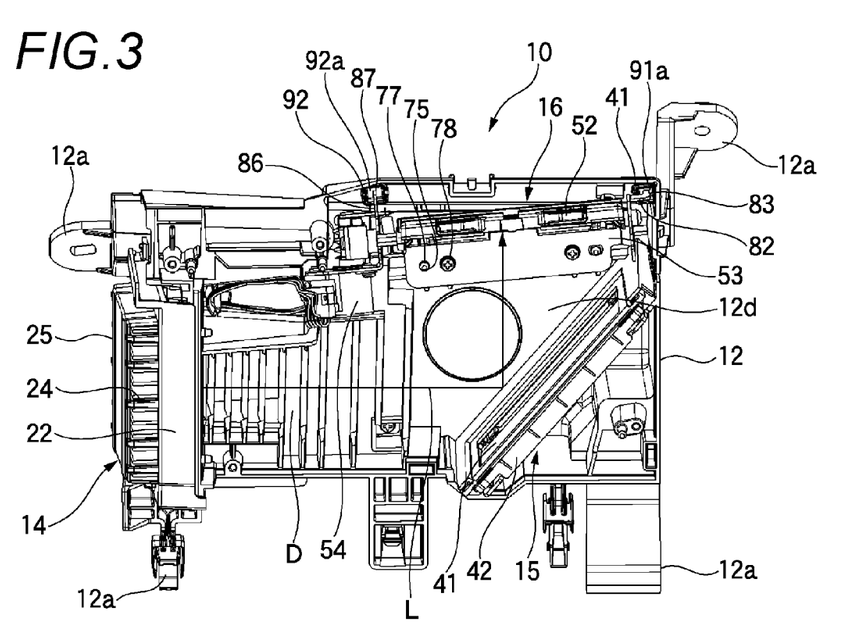
FIG. 3 is a plan view of the headup display device according to the embodiment of the present invention, from which an upper casing is detached.
Figure 4:
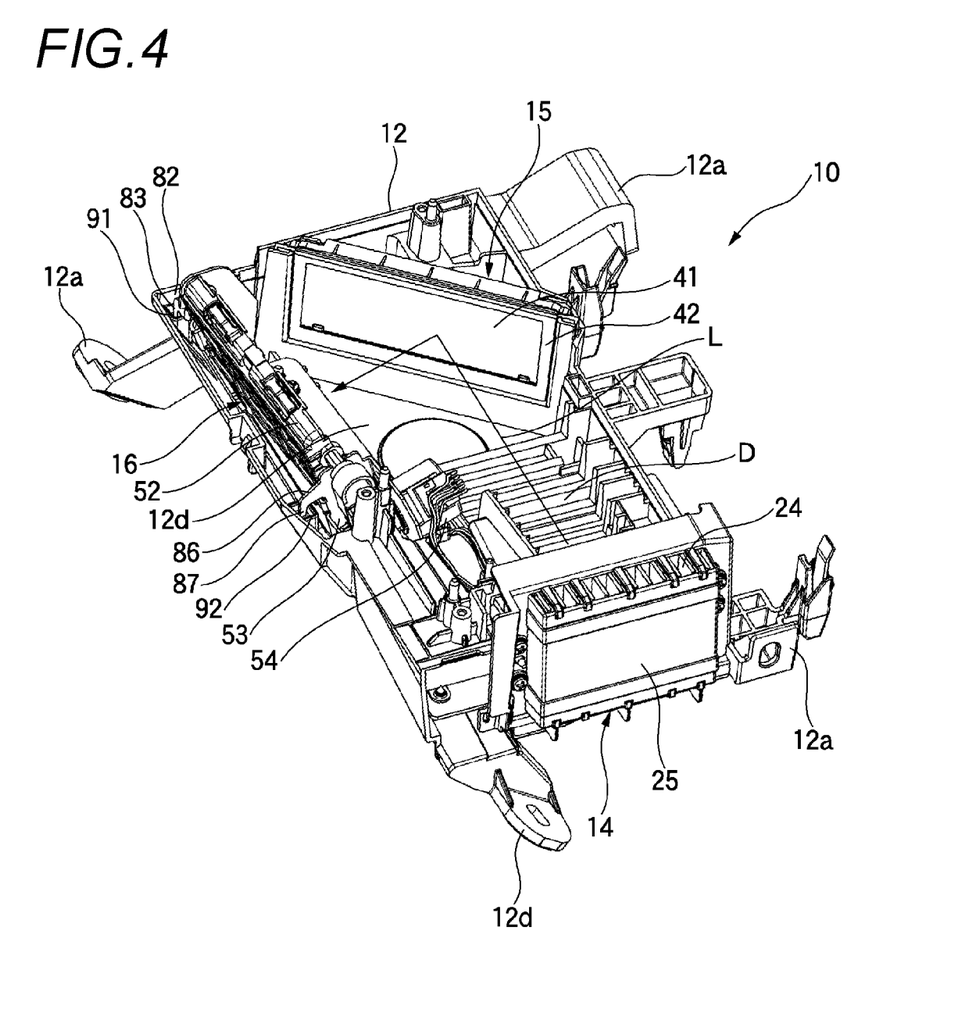
FIG. 4 is a perspective view of the headup display device according to the embodiment of the present invention, from which the upper casing is detached.
Figure 5:
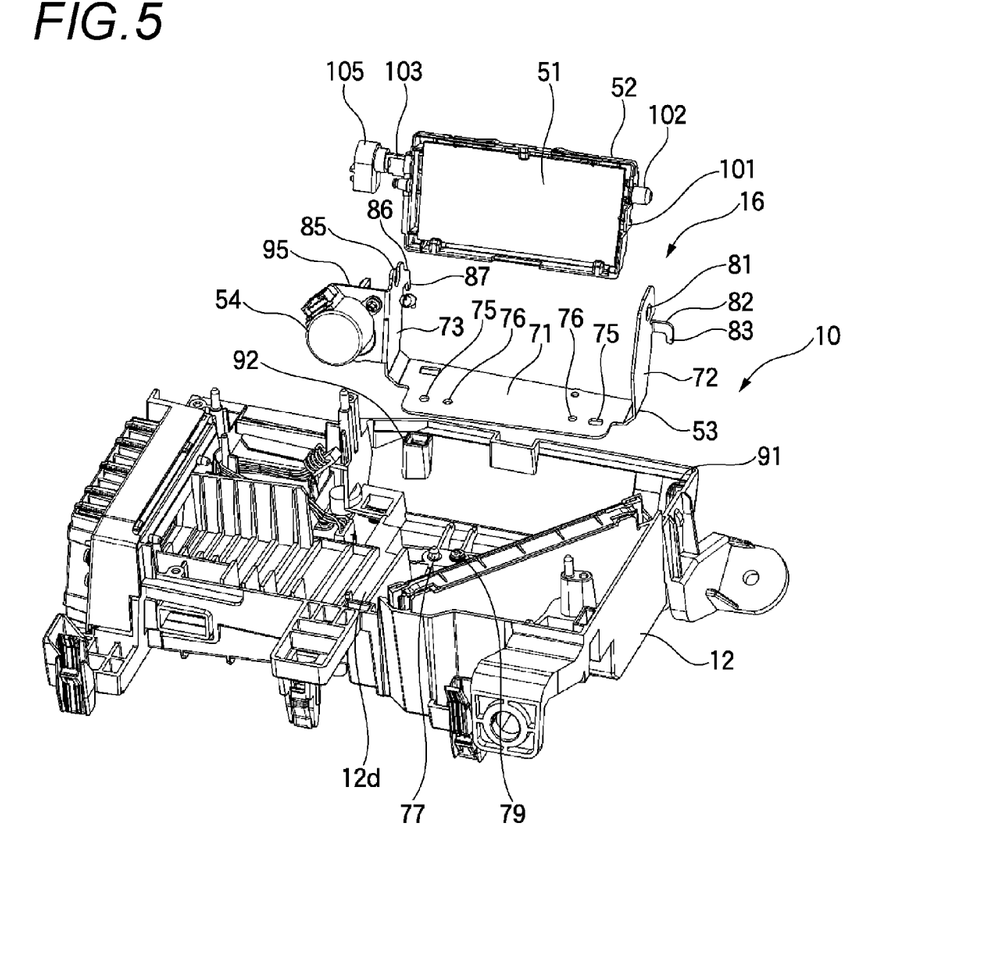
FIG. 5 is an exploded perspective view of a lower casing and a driving mirror assembly.
Figure 6:
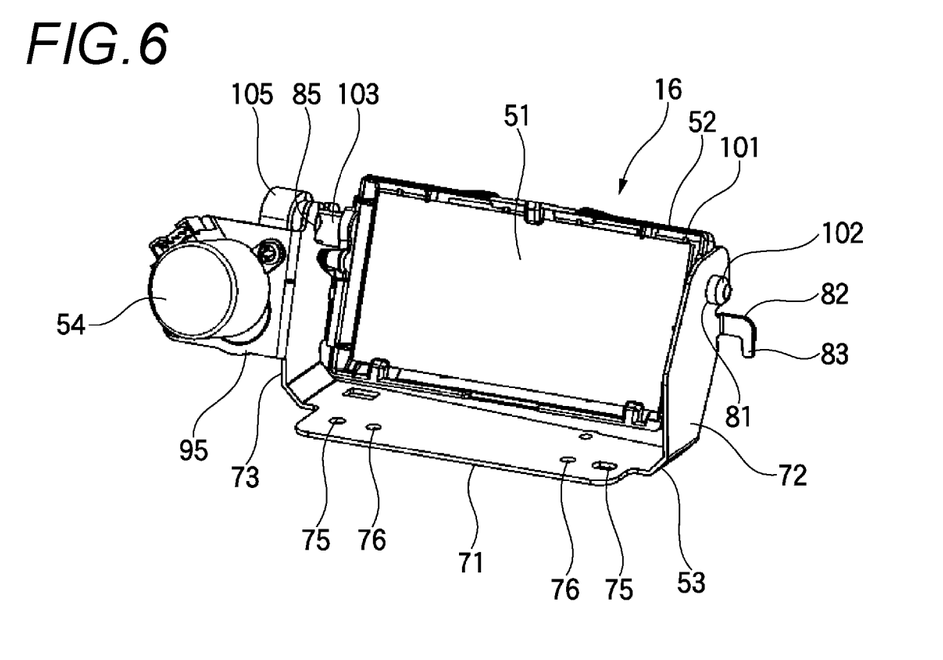
FIG. 6 is a perspective view of the driving mirror assembly.
Figure 7:
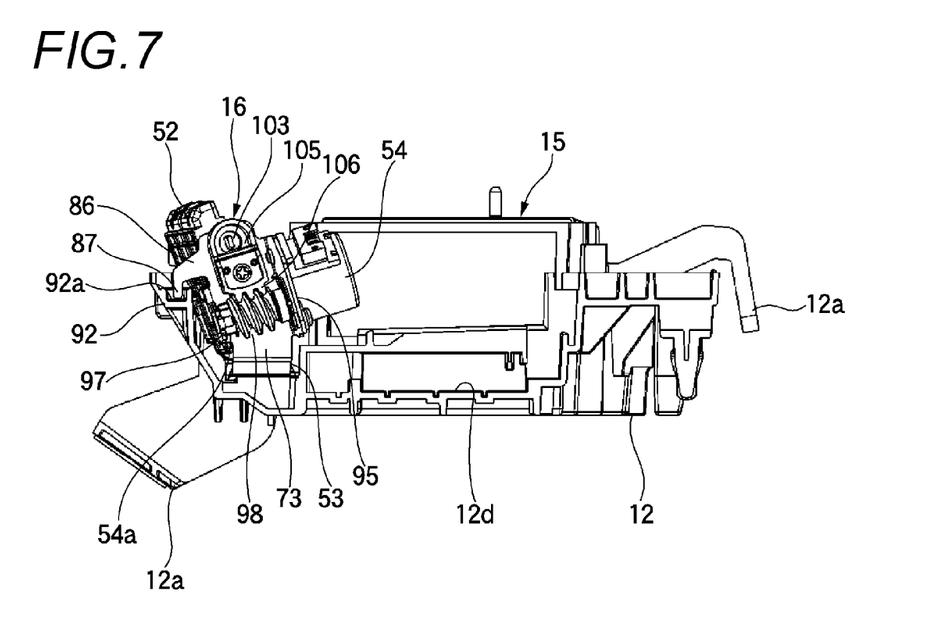
FIG. 7 is a crosssectional view of the headup display device.
Figure 8:
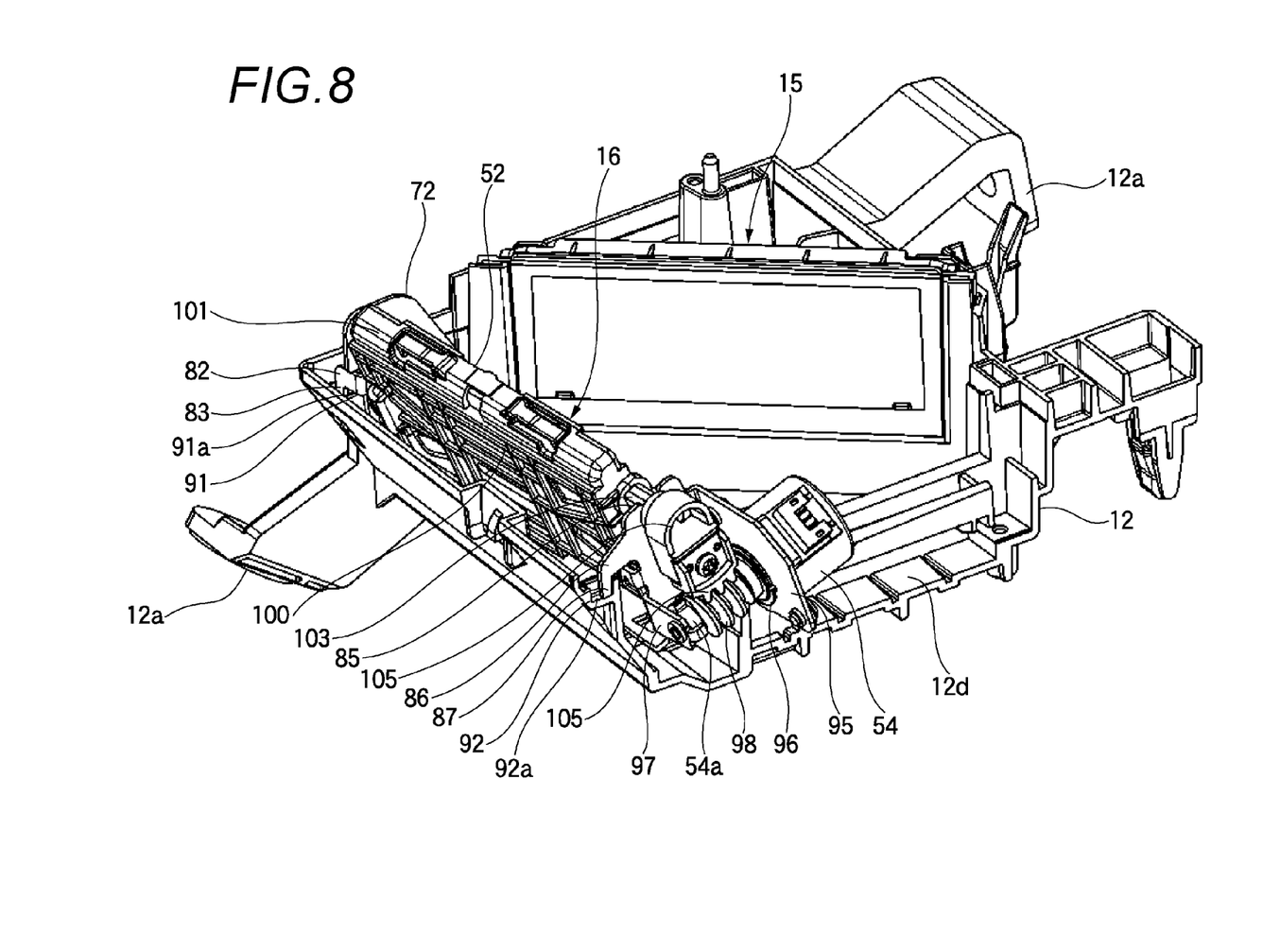
FIG. 8 is a fractured perspective view of the headup display device.

FIG. 1 is a perspective view illustrating the headup display device according to the embodiment of the present invention, from which an indicator assembly and a wiring substrate are detached. FIG. 2 is an exploded perspective view of the headup display device according to the embodiment of the present invention. FIG. 3 is a plan view of the headup display device according to the embodiment of the present invention, from which an upper casing is detached. FIG. 4 is a perspective view of the headup display device according to the embodiment of the present invention, from which the upper casing is detached. FIG. 5 is an exploded perspective view of a lower casing and a driving mirror assembly. FIG. 6 is a perspective view of the driving mirror assembly. FIG. 7 is a crosssectional view of the headup display device. FIG. 8 is a fractured perspective view of the headup display device.

As illustrated in FIGS. 1 and 2, a headup display device 10 includes a casing 11. The casing 11 includes a lower casing (or just "a casing") 12 and an upper casing 13. The casing 11 is configured by attaching the upper casing 13 to an upper portion of the lower casing 12.

As illustrated in FIGS. 3 and 4, an indicator assembly 14, a flat mirror assembly 15, and a driving mirror assembly (a driving mirror) 16 are mounted on the lower casing 12.

The indicator assembly 14 is mounted on one end side of the lower casing 12. The flat mirror assembly 15 is mounted on the other end side of the lower casing 12. Also, the drive mirror assembly 16 is mounted on one lateral portion of the lower casing 12.

As illustrated in FIGS. 1 and 2, the indicator assembly 14 has an indicator 22 made of a VFD (Vacuum Fluorescent Display), such as AMVFD, a heat sink 24, and a heat sink cover 25, which are integrated by a fixing means, such as a screw. The indicator assembly 14 irradiates display light L (see FIG. 3) onto a front surface side from the indicator 22. The irradiating path of the display light L emitted from the indicator 22 corresponds to an optical guide path D.

The indicator assembly 14 is mounted on the wiring board 31. The wiring board 31 is provided with a driving circuit for driving the indicator 22 of the indicator assembly 14, and the indicator assembly 14 is integrally mounted on one end side of the wiring board 31 at its surface side. In this way, the wiring board 31 extends along the irradiation direction of the display light L from the indicator 22 of the indicator assembly 14. Also, a connector 32 is mounted on the wiring board 31, and a connection port 32a of the connector 32 faces in a lateral direction.

The lower casing 12 is provided with a light guide frame 34 which is formed in a shape of a square tube to enclose the light guide path D, at the front surface of the indicator assembly 14. The display light L irradiated from the indicator assembly 14 is guided to the other end side of the lower casing 12 through the light guide frame 34. Also, the lower casing 12 is provided with a plurality of ghost preventing ribs 37, which are formed along a direction perpendicular to the irradiation direction, on an inner peripheral surface of the light guide frame 34 and a bottom surface ahead of the irradiation direction of the display light L rather than the light guide frame 34. The ghost preventing ribs 37 prevent formation of a virtual image due to diffused reflection of the display light L that is irradiated from the indicator assembly 14.

The flat mirror assembly 15 has a flat mirror 41 and a bezel 42, and the flat mirror 41 is fixed to the lower casing 12 by the bezel 42. The flat mirror assembly 15 is disposed ahead of the irradiation direction of the indicator light L from the display 22 of the indicator assembly 14, and is gently inclined in the lateral direction with respect to the irradiation direction of the display light L. In this way, the flat mirror assembly 15 reflects the display light L irradiated from the indicator 22 toward the driving mirror assembly 16 at one lateral portion of the lower casing 12 by the flat mirror 41.

As illustrated in FIGS. 5 and 6, the driving mirror assembly 16 has a reflective mirror 51 made of an aspherical mirror, for example, a concave mirror, a holder 52, a base plate 53, and a step motor (a driving motor) 54. The reflective mirror 51 is held by the holder 52, and the holder 52 is pivotally supported by the base plate 53 so that it pivots around a horizontal axis. The driving mirror assembly 16 is fixed to the lower casing 12 by screwing the base plate 53 to the bottom surface 12d of the lower casing 12. The step motor 54 pivots the holder 52 holding the reflective mirror 51, that is, the holder 52 is pivoted by the step motor 54, so that the direction of the reflective mirror 51 is changed.

The display light L reflected from the flat mirror 41 of the flat mirror assembly 15 is guided to the reflective mirror 51 of the driving mirror assembly 16. The reflective mirror 51 enlarges and reflects the display light L in an upward direction. In this instance, as the holder 52 is pivoted by the step motor 54 of the driving mirror assembly 16, the irradiation direction of the display light L is changed.

The casing 11 is configured by attaching the upper casing 13 to the upper surface of the lower casing 12 with screw fixing or the like, and thus the inside of the casing 11 is in a lightshielding state. The upper casing 13 has an opening 61 at a light guiding portion of the display light L which is reflected from the reflective mirror 51, and an outer glass 62 is attached to cover the opening 61.

The lower casing 12 is provided with a plurality of brackets 12a around the lower casing 12, and the headup display device 10 is fixed to a given mounting portion in an instrument panel by screwing the bracket 12a to the instrument panel.

In the headup display device 10 including the above configuration, the display light L irradiated from the indicator 22 configuring the indicator assembly 14 passes through the light guide path D of the lower casing 12, and is reflected from the flat mirror 41. After the display light L is enlarged and reflected by the reflective mirror 51, the display light L is emitted through the outer glass 62 in the opening 61 of the upper casing 13. Then, the display light L passes through the opening of the instrument panel, and is reflected by the windshield, so that it is guided to an eye range of the driver.

In this way, the driver can visually recognize the projected virtual image and a foreground of the vehicle to be superimposed and visually recognized through the windshield from the eye point of the vehicle.

Next, the concrete mounting structure of the driving mirror assembly 16 to the lower casing 12 will now be described.

As illustrated in FIGS. 5 to 8, the base plate 53 includes a fixing plate 71 which is fixed to the bottom surface 12d of the lower casing 12, and a pair of opposite support plates 72 and 73 are upright at both ends of the fixing plate 71. The fixing plate 71 is provided with positioning holes 75 and insertion holes 76. Positioning bosses 77 formed on the lower casing 12 are inserted in the positioning holes 75, so that the base plate 53 is positioned at a desired position of the lower casing 12. Also, screws 78 are inserted in the insertion hole 76 from the upper side, and then are fastened to threaded holes 79 formed in the lower casing 12, so that the base plate 53 is fixed to the lower casing 12.

One support plate 72 is provided with a support hole 81 near its head part. Also, the support plate 72 is provided with a positioning portion 82 near the support hole 81. The positioning portion 82 protrudes in a lateral direction from the support plate 72, and a front portion of the positioning portion is provided with a positioning projection 83 protruding in a downward direction which is a mounting direction of the base plate 53 to the lower casing 12.

The other support plate 73 is provided with a support groove 85 at its head part. Also, the support plate 73 is provided with a positioning portion 86 near the support groove 85. The positioning portion 86 is pushed rearward from the support plate 73, and a head part of the positioning portion is provided with a positioning projection 87 protruding in the downward direction which is the mounting direction of the base plate 53 to the lower casing 12.

The lower casing 12 is provided with holding recessed portions 91 and 92 with upper portions opened. Positioning projections 83 and 87 of the positioning portions 82 and 86, which are formed on the support plates 72 and 73 of the base plate 53 attached to the bottom surface 12d of the lower casing 12, are inserted and firmly held in the holding recessed portions 91 and 92. In this way, the support hole 81 of the support plate 72 and the support groove 85 of the support plate 73 are positioned at a predetermined position.

In addition, each of the holding recessed portions 91 and 92 receiving the positioning projections 83 and 87 therein has a bottom surface, that forms each deformation suppressing wall 91a and 92a (see FIG. 3). When the positioning projections 83 and 87 are inserted in the holding recessed portions 91 and 92, the head parts of the positioning projections 83 and 87 abut against the deformation suppressing walls 91a and 92a which are formed by the bottom surfaces of the holding recessed portions 91 and 92. As a result, the height position of the support hole 81 of the support plate 72 and the support groove 85 of the support plate 73 is positioned.

As the positioning projections 83 and 87 are inserted in the holding recessed portions 91 and 92 and the head parts of the positioning projections 83 and 87 abut against the deformation suppressing walls 91a and 92a which are formed by the bottom surfaces of the holding recessed portions 91 and 92, the deformation suppressing walls 91a and 92a are disposed against the positioning projections 83 and 87 without a gap ahead of an acting direction of the torque, which is generated when the holder 52 is pivoted by the step motor 54, acting on the support plates 72 and 73.

Furthermore, the support plate 73 is provided with a stay portion 95 at its front portion. The stay portion 95 is bent in a direction perpendicular to the support plate 73, and the step motor 54 is fixed to the stay portion 95. The stay portion 95 is provided with a window 96 (see FIG. 8), and a driving shaft 54a of the step motor 54 protrudes rearward through the window 96. Also, the support plate 73 is provided with a bearing 97 at its rear portion. The front portion of the driving shaft 54a of the step motor 54 is rotatably supported by the bearing 97. A rack gear 98 is attached to the driving shaft 54a of the step motor 54.

The holder 52 holding the reflective mirror 51 has a rear plate 100 covering a rear surface of the reflective mirror 51, and a frame 101 enclosing a circumference of the reflective mirror 51. The reflective mirror 51 is fitted in the frame 101 from the front side of the holder 52. The frame 101 is provided with a support shaft 102 at one side thereof, and the support shaft 102 is inserted in the support hole 81 formed in the one support plate 72 and is rotatably supported therein. Also, the frame 101 has a support shaft 103 at the other side, and the support shaft 103 is inserted in the support groove 85, which is formed on the other support plate 73 of the base plate 53, from the upward side, and is rotatably supported therein. In this way, the holder 52 holding the reflective mirror 51 is supported by the base plate 53 so that the holder can be pivoted around a horizontal axis.

A transmission member 105 is fixed to the end of the other support shaft 103. A gear 106 is fixed to a lower end of the transmission member 105, and the rack gear 98 is meshed with the gear 106. In this way, when the step motor 54 drives to rotate the driving shaft 54a, the rotator power is transmitted from the rack gear 98 to the gear 106. The transmission member 105 is rotated around the axis of the support shaft 103, and thus the holder 52 holding the reflective mirror 51 is pivoted around the horizontal axis which is the axes of the support shafts 102 and 103. In this way, the pivoting movement of the reflective mirror 51 is changed, and the projection angle of the display light L reflected from the reflective mirror 51 and then emitted from the front glass 62 provided on the opening 61 of the upper casing 13.

In the driving mirror assembly 16, when the step motor 54 drives to pivot the holder 52 holding the reflective mirror 51, the torque is generated from the respective support plates 72 and 73 of the base plate 53 in its rotational direction. Then, each of the support plates 72 and 73 of the base plate 53 is bent by the torque, and thus the angle of the reflective mirror 51 is displaced, so that the display position of the virtual image is displaced.

In the headup display device 10 according to this embodiment, even though the support plates 72 and 73 of the base plate 53 are about to be deformed by the torque generated when the holder 52 is pivoted by the step motor 54 to change the angle of the reflective mirror 51, the positioning projections 83 and 87 are held by the holding recessed portions 91 and 92 of the lower casing 12. As a result, the torque acting on the support plates 72 and 73 is received by the lower casing 12, thereby suppressing deformation of the support plates 72 and 73 of the base plate 53.

In this way, it is possible to suppress the angle of the reflective mirror 51 from being displaced due to the deformation of the support plates 72 and 73 of the base plate 53. Accordingly, it is possible to suppress the displacement in the display position of the virtual image which is reflected from the reflective mirror 51 and illuminated on the windshield of the vehicle.

That is, according to the headup display device 10 according to this embodiment, the positional accuracy of the reflective mirror 51 adjusting the projection angle of the display light L is improved, thereby suppressing the displacement in the display position of the virtual image as much as possible.

In particular, since the deformation suppressing walls 91a and 92a which are formed by the bottom surface of the holding recessed portions 91 and 92 are disposed against the positioning projections 83 and 87 without a gap ahead of an acting direction of the torque, which is generated when the holder 52 is pivoted by the step motor 54, acting on the support plates 72 and 73, the deformation suppressing walls 91a and 92a receive the positioning projections 83 and 87, thereby reliably suppressing the support plates 72 and 73 from being deformed.

The present invention is not limited to the abovedescribed embodiment, and a modification or an alteration are allowed. In addition, material, shape, size, number, location or the like of each component is arbitrary and not limited as long as they can attain the present invention.

The present application is based upon and claims the benefit of Japanese patent application No. 2011274715 filed on Dec. 15, 2011, the contents of which are incorporated by reference in its entirety.

What is claimed is:

1. A headup display device, comprising:
a casing having a bottom surface; and
a driving mirror configured to reflect a display light irradiated from an indicator to guide the reflected display light to a windshield of a vehicle, the driving mirror including:
   a base plate fixed to the bottom surface of the casing;
   a pair of opposite support plates which are upright on the base plate;
   a holder pivotally supported by the pair of opposite support plates;
   a reflective mirror held by the holder;
   a driving motor configured to pivot the holder to change an angle of the reflective mirror; and
   a positioning projection provided on each of the pair of support plates near a support portion of the holder and protruding in a mounting direction of the base plate to the bottom surface of the casing, wherein
a holding recessed portion is formed on the casing to allow an insertion of the positioning projection therein and hold the positioning projection at a predetermined position.

2. The headup display device according to claim 1, wherein
a bottom surface of the holding recessed portion forms a deformation suppressing wall which is disposed against the positioning projection without a gap ahead of an acting direction of torque, which is generated when the holder is pivoted by the driving motor, acting on the pair of support plates, to suppress deformation of the pair of support plates when the holder is pivoted.

3. The headup display device according to claim 1, wherein
a positioning portion having the positioning projection provided on one of the pair of support plates is formed perpendicularly from a surface of the one of the pair of support plates, and
a positioning portion having the positioning projection provided on the other of the pair of support plates is formed parallel from a surface of the other of the pair of support plates.

* * * * *